United States Patent [19]

Yokoyama

[11] Patent Number: 5,751,365
[45] Date of Patent: May 12, 1998

[54] MOTION COMPENSATED INTER-FRAME PREDICTION METHOD AND APPARATUS USING MOTION VECTOR INTERPOLATION WITH ADAPTIVE REPRESENTATION POINT ADDITION

[75] Inventor: Yutaka Yokoyama, Tokyo, Japan

[73] Assignee: NEC Corporation, Tokyo, Japan

[21] Appl. No.: 691,919

[22] Filed: Aug. 1, 1996

[30] Foreign Application Priority Data

Aug. 4, 1995 [JP] Japan .................................. 7-200085

[51] Int. Cl.⁶ .......................... H04N 7/133; H04N 7/137
[52] U.S. Cl. ............................................ 348/416; 348/699
[58] Field of Search ............................... 348/699, 402, 348/415, 700, 407, 409, 412–413; H04N 7/133, 7/137

[56] References Cited

U.S. PATENT DOCUMENTS

| | | | |
|---|---|---|---|
| 5,276,513 | 1/1994 | Van Der Wal et al. | 358/136 |
| 5,289,274 | 2/1994 | Kondo | 348/208 |
| 5,400,087 | 3/1995 | Uramoto et al. | 348/699 |
| 5,534,928 | 7/1996 | Iwamura | 348/401 |
| 5,537,155 | 7/1996 | O'Connell et al. | 348/699 |
| 5,546,129 | 8/1996 | Lee | 348/699 |
| 5,579,401 | 11/1996 | Gear | 382/100 |
| 5,581,308 | 12/1996 | Lee | 348/699 |
| 5,581,309 | 12/1996 | Okino et al. | 348/699 |

FOREIGN PATENT DOCUMENTS 6-327000  11/1994  Japan .

OTHER PUBLICATIONS

Inoue et al., "A Motion Compensation Scheme . . . –Interpolation Based on a Variable Block–Size Method", *D–151 of Autumn Meeting of the Electronic Information Communication Society*, 1994, p. 157.

Huang et al., "A New Motion Compensation Method for Image Sequence Coding . . . Grid Interpolation", *IEEE Transactions on Circuits and Systems for Video Technology*, vol. 4, No. 1, Feb. 1994, pp. 42–52.

Huang, et al., A New Motiion Compensation Method For Image Sequence Coding Using Hierarchical Grid Interpolation, IEEE ToCaSfVT, vol. 4, No. 1, pp. 42–52, Feb. 1994.

*Primary Examiner*—Tommy P. Chin
*Assistant Examiner*—David R. Vincent
*Attorney, Agent, or Firm*—Sughrue, Mion, Zinn, Macpeak & Seas, PLLC

[57] ABSTRACT

Plural representative points are set in a predetermined arrangement in a frame, and the representative points thus arranged are linked to each other to partition the frame into plural segments. Further, additive representative points are adaptively added in segments, excluding the boundary lines between the segments. Accordingly, the effect of the addition of the additive representative points is limited to the interior of the segment concerned, and thus can be prevented from extending to adjacent segments. Therefore, adaptive processing which is independent on a segment basis can be achieved.

7 Claims, 7 Drawing Sheets

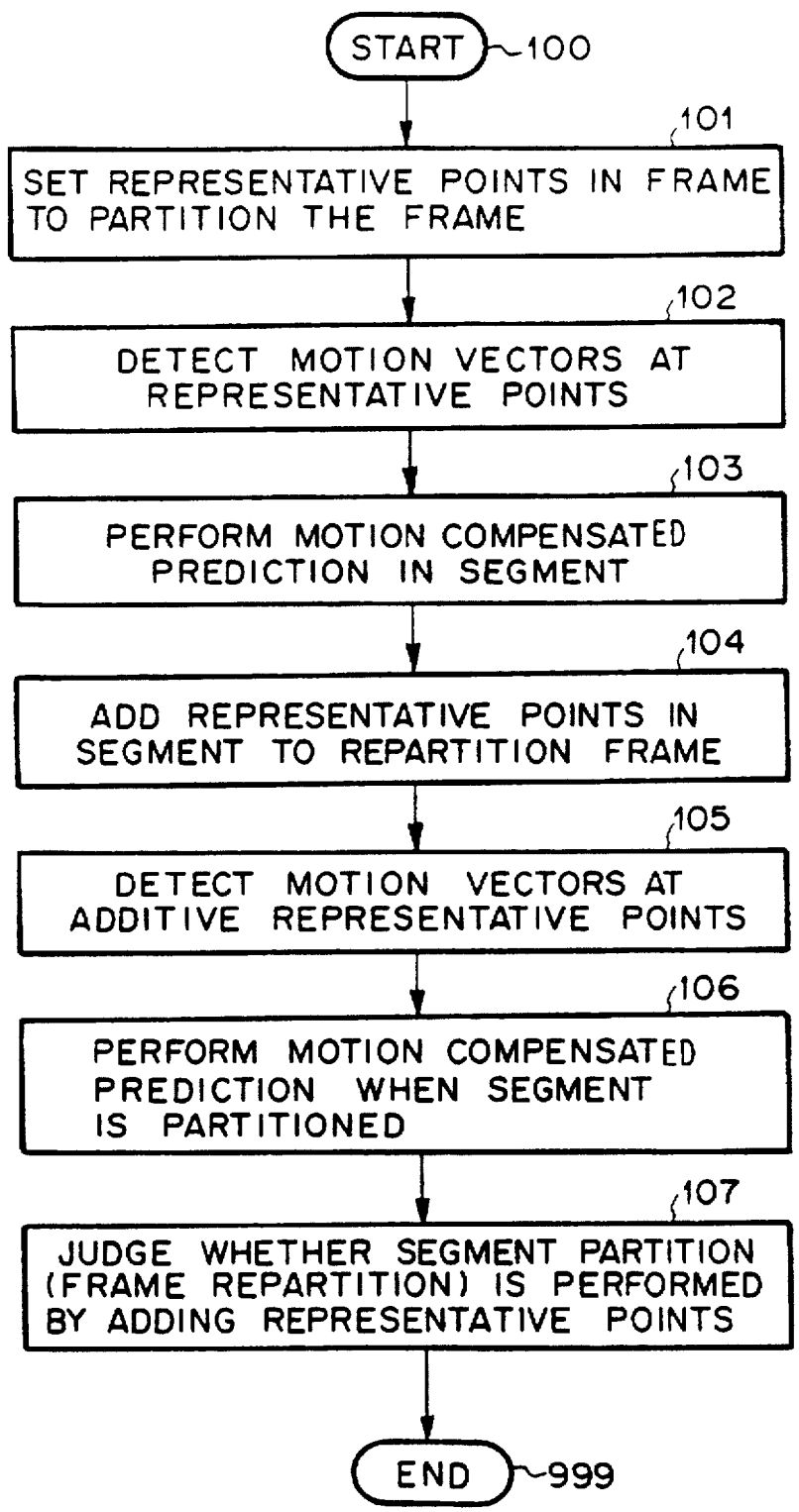

FIG. 2A
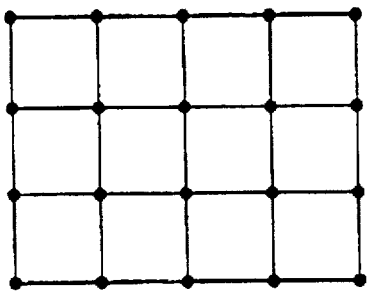
FIG. 2B
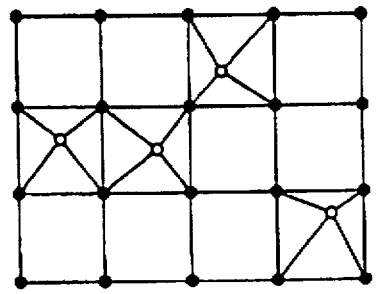
● : REPRESENTATIVE POINT
○ : ADDITIVE POINT
FIG. 3A  FIG. 3B
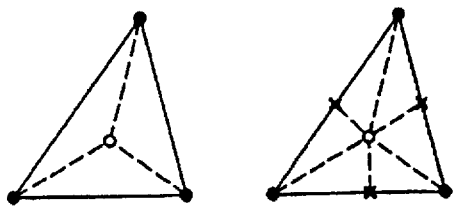
FIG. 3C  FIG. 3D  FIG. 3E  FIG. 3F
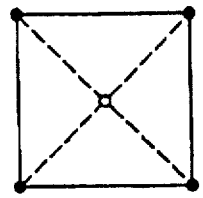 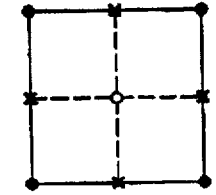 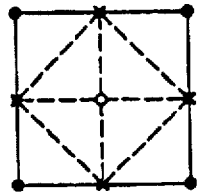 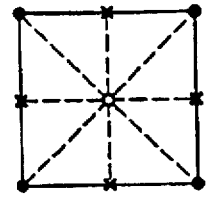
FIG. 3G  FIG. 3H  FIG. 3I  FIG. 3J
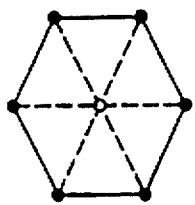 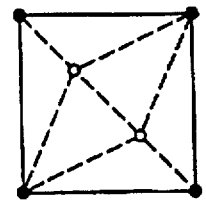 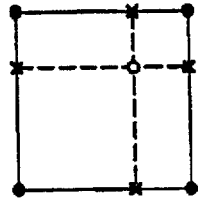 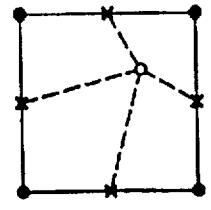
● : REPRESENTATIVE POINT
○ : ADDITIVE REPRESENTATIVE POINT
---- : PARTITION LINE
× : MOTION VECTOR INTERPOLATIVE POINT

● : REPRESENTATIVE POINT
▬ : OUTLINE

ON PREVIOUS FRAME IMAGE    ON CURRENT FRAME IMAGE

● : REPRESENTATIVE POINT
○ : ADDITIVE REPRESENTATIVE POINT
---- : PARTITION LINE

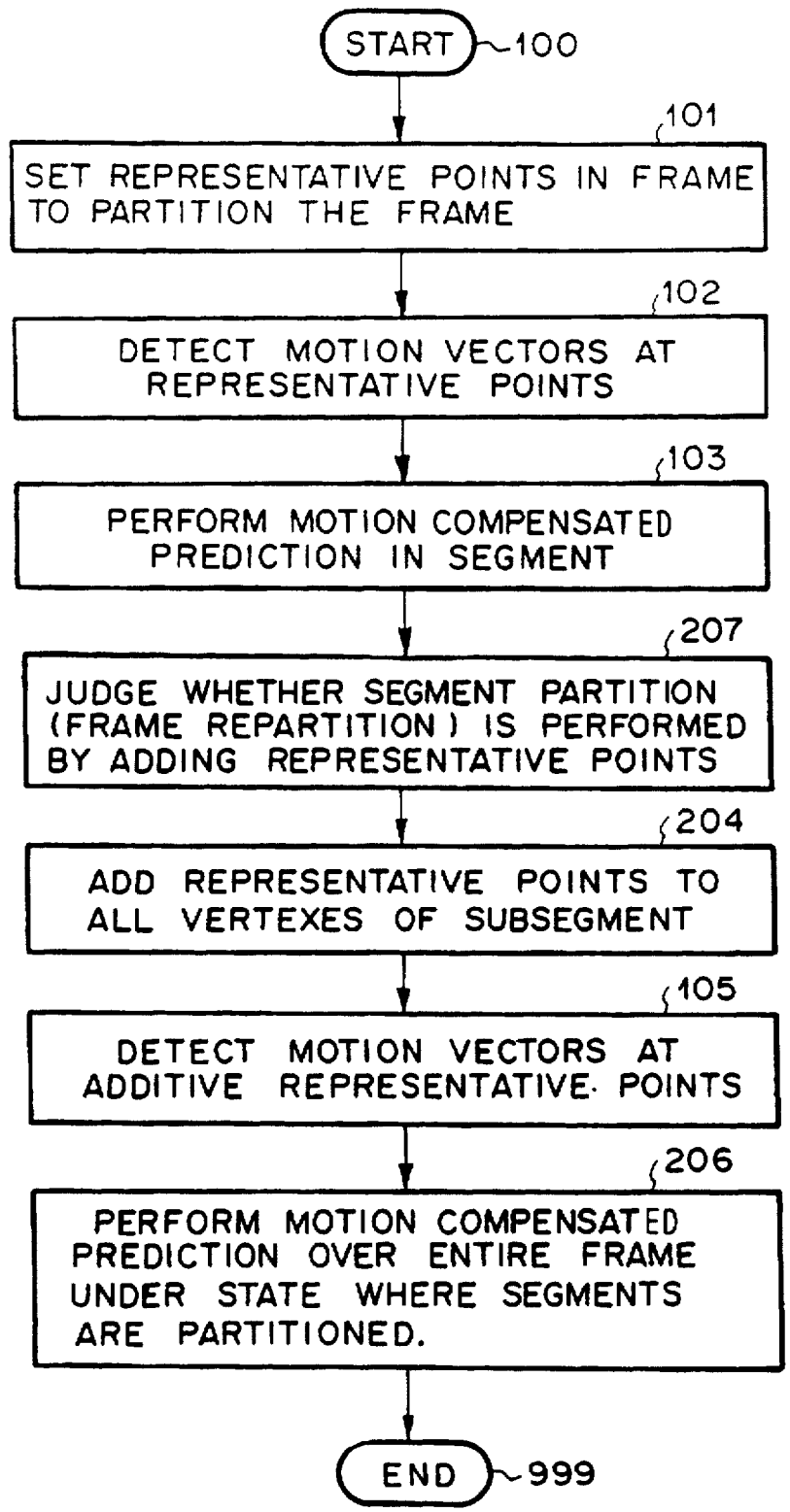

● : REPRESENTATIVE POINT
○ : ADDITIVE REPRESENTATIVE POINT
× : MOTION VECTOR INTERPOLATIVE POINT

● : REPRESENTATIVE POINT
○ : ADDITIVE REPRESENTATIVE POINT
---- : PARTITION LINE
× : MOTION VECTOR INTERPOLATIVE POINT

5,751,365

MOTION COMPENSATED INTER-FRAME PREDICTION METHOD AND APPARATUS USING MOTION VECTOR INTERPOLATION WITH ADAPTIVE REPRESENTATION POINT ADDITION

BACKGROUND OF THE INVENTION

1. Field of the Invention

The present invention relates to a method and an apparatus for performing a motion compensated inter-frame prediction of moving pictures to code the moving pictures by interpolating motion (displacement) vectors at all picture element (pel) positions in a frame on the basis of the motion vectors of plural representative points which are predetermined in the frame, and particularly to motion compensated inter-frame prediction method and apparatus for adaptively adding representative points to segments which are formed by linking the representative points set in the frame, and then re-partitioning the frame into segments.

2. Description of Related Art

A method in which the motion vectors at all picture element positions in a frame are interpolated on the basis of the motion vectors of plural representative points predetermined in the frame to generate prediction signals, has been known as a motion compensated inter-frame prediction method which is used for coding of moving pictures. In this method, a frame is partitioned into plural segments (patches) by linking predetermined representative points in the frame, and then additive representative points are adaptively added to the segments thus formed to re-partition the frame, thereby enhancing a prediction efficiency.

An example of this method is disclosed in "A Motion Compensation Scheme Using Displacement-Vector-Interpolation Based on a Variable Block-Size Method", D-151 of Autumn Meeting of the Electronic Information Communication Society in 1994. In this method, an image is initially partitioned into square blocks each having a predetermined size, and representative points are set at the vertexes of the respective square blocks. Subsequently, each of some blocks which are selected on the basis of a predetermined criterion is repartitioned into four equal segments (i.e., each block is further quadrisectioned) as shown in FIG. 9, and representative points are added at the vertexes of the newly formed blocks (points A, B, C, D, E in FIG. 9). With this method, the arrangement density of the representative points can be made variable.

FIG. 10 is a flowchart for the conventional motion compensated inter-frame prediction method as described above. First, representative points are set in the frame, and the frame is partitioned into plural segments by linking the representative points to one another (step 101). For example, the representative points are arranged at the intersection points of square grids as shown in FIG. 11A to partition the frame into segments each having a square block. Subsequently, the motion vectors at the representative points are detected (step 102), and the motion compensated prediction in the segments is performed (step 103). That is, the motion vector of any picture element in each segment is calculated on the basis of linear interpolation of the motion vectors at the four vertexes to generate a prediction signal. Subsequently, on the basis of the result of the motion compensated prediction, it is judged every segment whether the frame should be repartitioned (step 207). In this case, the repartition is set to be performed if the magnitude of the prediction error is larger than a predetermined threshold value, for example. A segment on which the partition is judged to be performed is added with new or additive representative points to perform the repartition as shown in FIG. 11B (step 204). That is, the segment is partitioned into plural subsegments by linking the new representative points in the segment. Thereafter, the motion vectors at the additive representative points are detected (step 105). Finally, the motion compensated prediction is performed on the whole frame while some segments selected by the judgment as described above are subjected to the partition (step 206). Actually, in the final processing as described above, the motion compensated prediction is performed every subsegment on the assumption that all the segments in the frame are partitioned as shown in FIG. 11C. The motion vectors at positions which correspond to the vertexes of the subsegments and at which no motion vector is detected in the step 105 (in the process of detecting the motion vectors at the additive representative points), are calculated by the linear interpolation of the motion vectors at the representative points which are initially set in the frame.

In the conventional method as described above, some additive representative points are disposed on the boundaries of the segments before the repartition as shown in FIGS. 11B and 11C. Therefore, a motion vector which is detected at such an additive representative point has an effect on the prediction of a segment adjacent to the segment containing the additive representative point. For example, when it is judged that a segment K should be partitioned as shown in FIG. 12, the motion vector at a representative point P which is added on a side of the segment K has an effect on the prediction of a meshed portion of a segment L adjacent to the segment K. Therefore, it is difficult to perform the independent prediction processing on a segment basis. Even if a segment is judged not to be partitioned, it is required to try the prediction on the segment again. In FIGS. 11A to 11C and FIG.12, (•) means a representative point, (○) means an additive representative point, ( - - - ) means a partition line, and (X) means a motion vector interpolative point.

SUMMARY OF THE INVENTION

An object of the present invention is to provide a motion compensated inter-frame prediction method which can prevent an effect of partition of a segment (repartition of a frame) from extending to segments adjacent to the segment and perform independent prediction processing on a segment basis.

Another object of the present invention is to provide a motion compensated inter-frame prediction apparatus which can prevent an effect of partition of a segment from extending to segments adjacent to the segment and perform independent prediction processing on a segment basis.

In order to attain the above objects, according to a first aspect of the present invention, a motion compensated inter-frame prediction method which comprises a step of setting plural representative points in a frame represented by moving picture signals and linking the representative points to one another to form plural segments in the frame, a step of detecting the motion vectors at the plural representative points as representative point motion vectors, and a step of interpolating the motion vectors at all picture element positions within the respective segments on the basis of the representative point motion vectors to perform the motion compensated prediction within each segment, is characterized by further comprising a step of adaptively and additionally setting additive representative points in the respective segments excluding the boundaries therebetween and linking each of the additive representative points to the representative points surrounding the additive representative point to form subsegments, a step of detecting the motion vector at the additive representative point as an additive representative point motion vector, and a step of interpolating the motion vectors at all the picture element positions in the subsegment on the basis of the additive representative point motion vectors to perform the motion compensated prediction within each subsegment.

In the method as described above, the step of performing the motion compensated prediction in each segment comprises a step of interpolating the motion vectors at all the picture element positions in the segment on the basis of the representative point motion vectors to generate a first predictive signal, and the step of performing the motion compensated prediction in each subsegment comprises a step of interpolating the motion vectors at all the picture element positions in the subsegment on the basis of the additive representative motion vectors to generate a second prediction signal.

Further, the method as described above further comprises a step of comparing the first prediction signal and the second prediction signal to select segments for which the segment partition is adaptively performed.

According to a second aspect of the present invention, a motion compensated inter-frame prediction apparatus which comprises first means for setting plural representative points in a frame which is represented by moving picture signals and linking the representative points to form segments in the frame, second means for detecting the motion vectors at the plural representative points as representative point motion vectors, and third means for interpolating the motion vectors at all picture element positions in each segment to perform the motion compensated prediction in the segment, is characterized by further comprising fourth means for adaptively and additionally setting additive representative points in the respective segments excluding the boundaries therebetween and linking each of the additive representative points to the representative points surrounding the additive representative point to form subsegments, fifth means for detecting the motion vector at the additive representative point as an additive representative point motion vector, and sixth means for interpolating the motion vectors at all the picture element positions in the subsegment on the basis of the additive representative point motion vector to perform the motion compensated prediction on the subsegment.

In the apparatus as described above, the third means interpolates the motion vectors at all the picture element positions in the segment on the basis of the representative point motion vectors to generate a first predictive signal, and the sixth means interpolates the motion vectors at all the picture element positions in the subsegment on the basis of the additive representative motion vectors to generate a second prediction signal.

Further, the apparatus as described above further comprises means for comparing the first prediction signal and the second prediction signal to select segments for which the segment partition is adaptively performed.

According to a third aspect of the present invention, a method for performing motion compensated inter-frame prediction by interpolating the motion vectors at all the picture element positions in a frame on the basis of the motion vector at plural representative points which is determined in a frame when moving pictures are coded, is characterized in that the plural representative points are set in a predetermined arrangement on the frame, the representative points are linked to form segments, and the representative points are further adaptively added only within the respective segments, excluding boundary lines of the segments, thereby varying the arrangement density of the representative points.

BRIEF DESCRIPTION OF THE DRAWINGS

FIG. 1 is a flowchart showing a motion compensated inter-frame prediction method according to an embodiment of the present invention;

FIGS. 2A to 2B are a diagram showing an adaptive repartition mode used in the present invention;

FIGS. 3A to 3J are a diagram showing a repartition method used in the present invention;

FIG. 10 is a flowchart for showing a conventional motion compensated inter-frame prediction method;

DETAILED DESCRIPTION OF THE PREFERRED EMBODIMENT

A preferred embodiment according to the present invention will be described with reference to the accompanying drawings.

FIG. 1 shows a process flow in a motion compensated inter-frame prediction method according to an embodiment of the present invention.

In this method, representative points are first set in a frame and linked to one another to form segments in the frame, thereby sectioning the frame with the segments (step 101). For example, the frame is partitioned into square segments as shown in FIG. 2A, and representative points are set at the intersection points of the square grids. Subsequently, the motion vectors at the representative points are detected (step 102). The motion compensated prediction in each segment is performed according to the motion vectors thus detected (step 103). In the motion compensation, the motion vector at each picture element in a square segment is calculated on the basis of the motion vectors at the four vertexes of the segment by a linear interpolation method to generate a prediction signal. Subsequently, a representative point as shown in FIG. 3C is added as an additive representative point to each segment to partition the segment into subsegments (i.e., perform segment partition) (step 104), and the motion vector at each additive representative point is detected (step 105). Here, the motion compensated prediction when the segment partition is performed (step 106), and prediction errors before and after the segment partition are compared with each other to select segments on which the partition should be adaptively performed (step 107). For example, the segment partition is adaptively performed as shown in FIG. 2B.

Figure 4:
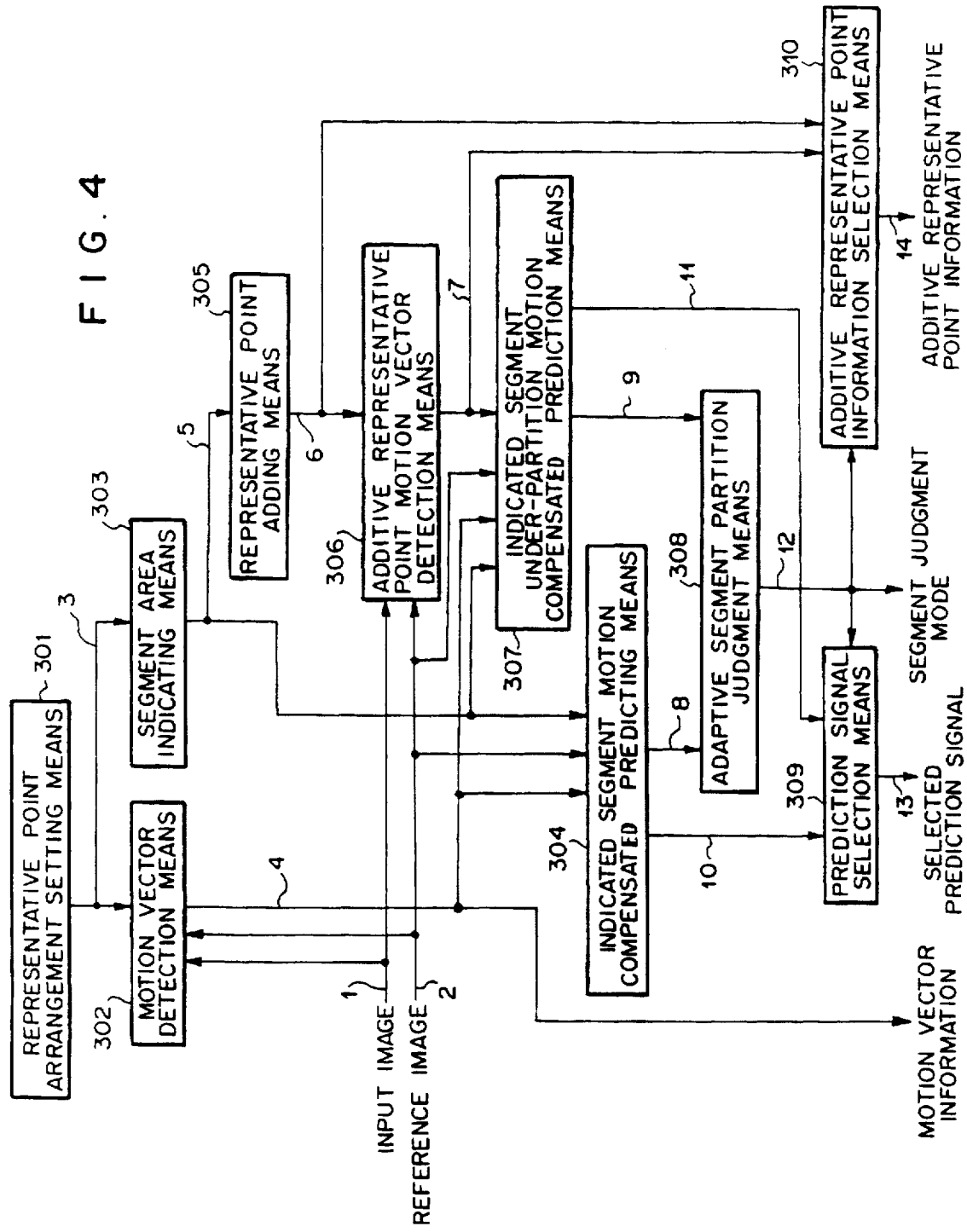
FIG. 4 is a block diagram showing a motion compensated inter-frame prediction apparatus to perform the motion compensated inter-frame prediction method according to the embodiment.

FIG. 4 is a block diagram showing the motion compensated inter-frame prediction apparatus to perform the motion compensated inter-frame prediction method according to the embodiment as described above.

In the motion compensated inter-frame prediction apparatus shown in FIG. 4, a representative point arrangement setting means 301 sets an arrangement of basic representative points, and outputs representative point position information 3 representing the set position of each representative point. A motion vector detection means 302 detects the motion vector at the representative point position represented by the representative point position information 3 on the basis of an input image 1 and a reference image 2 and outputs motion vector information 4 representing the detected motion vector. A segment area indicating means 303 outputs segment area information 5 for successively indicating segments formed by linking the representative points which are represented by the representative point position information 3. An indicated segment motion compensated prediction means 304 performs the motion compensated prediction on the basis of the detected motion vector represented by the motion vector information 4 every segment indicated by the segment area information 5, thereby generating a prediction signal 10 from the reference image 2, and output the prediction signal together with the prediction error 8. A representative point adding means 305 adds an additive representative point into the segment which is indicated by the segment area information 5, and outputs additive representative point position information 6 representing the additive representative point position. An additive representative point motion vector detection means 306 detects the motion vector at the additive representative point position indicated the additive representative point position information 6 on the basis of the input image 1 and the reference image 2, and outputs additive representative point motion vector information 7 representing the detected motion vector.

An indicated segment under-partition motion compensated prediction means 307 performs the motion compensated prediction on the basis of the detected motion vector represented by the additive representative point motion vector information 7 every segment indicated by the segment area information 5 (i.e., performs the motion compensated inter-frame prediction when the an additive representative point is added to the indicated segment, and the indicated segment is partitioned into subsegments) to generate a prediction signal 11 from the reference image 2, and then outputs the prediction signal 11 together with the prediction error 9. An adaptive segment partition judgment means 308 compares the prediction error 8 when the indicated segment is partitioned and the prediction error 9 when the indicated segment is not partitioned, thereby judging whether the indicated segment should be partitioned, and then outputs as a judgment result a segment judgment mode 12 representing whether the partition should be performed (frame repartition is performed). If the judgment result represented by the segment judgment mode 12 indicates the partition, a prediction signal selection means 309 selects and outputs as a selected prediction signal 13 the prediction signal 11 when the partition is performed. If the judgment result indicates no partition, it selects and outputs as a selected prediction signal 13 the prediction signal 10 when no partition is performed. An additive representative point information selection output means 310 outputs as additive representative point information 14 the additive representative point position information 6 and the additive representative point motion vector information 7 at that position only when the judgment result represented by the segment judgment mode 12 indicates the partition. The additive representative point position may be set to a predetermined position, and in this case it is unnecessary to output the additive representative point information 14.

Each processing means will be individually described hereunder.

Figure 5A:
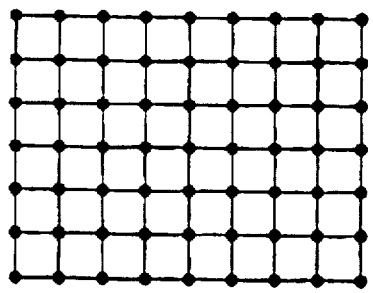
FIGS. 5A to 5E are a diagram showing an adaptive repartition mode used in the present invention.
Figure 5B:
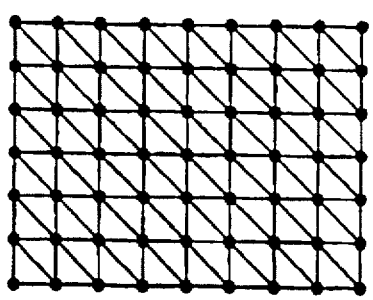
Figure 5C:
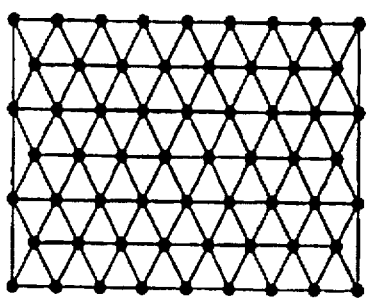
Figure 5D:
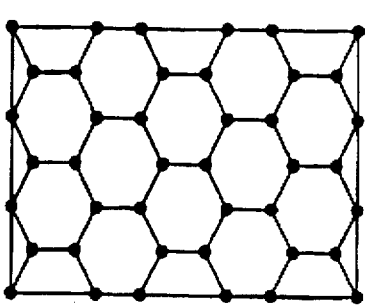
Figure 5E:
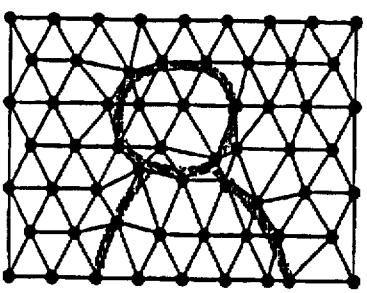

In the representative point arrangement setting means 301, the representative points are arranged at predetermined positions in an image. FIGS. 5A to 5E show examples of the arrangement of the representative points which are set by this means. In FIGS. 5A to 5E, (•) represents a representative point and (thick lines) means an outline. FIGS. 5A and 5B show that the representative points are arranged at the vertexes of the rectangular blocks. The segments which are constructed by linking the representative points may be designed in a rectangular form as shown in FIG. 5A or in a triangular form which is obtained when a diagonal line is added to each square as shown in FIG. 5B. Besides, the representative points may be arranged in a triangular grid shape as shown in FIG. 5C or in a hexagonal grid shape as shown in FIG. 5D. The positions of the representative points which are arranged in the method as described above are set as initial positions, and then this arrangement may be subjected to correction processing to provide another arrangement having a deformed segmentation structure. For example, as shown in FIG. 5E, an outline is extracted from the frame, and the positions of the representative points are corrected so that the boundary lines of the segments are matched with the detected outline.

The following description will be made mainly on a method of performing the motion compensated inter-frame prediction by using triangular segments. However, the shape of the segment is not limited to the triangle, and it may be a polygonal shape having a larger number of vertexes than the triangle.

Here, the method of detecting the motion vectors at the representative points in the motion vector detection means 302 will be described. A block matching algorithm method may be used for the detection of the motion vectors, and a rectangular block of fixed size may be used as a matching target area. Further, when the matching is performed by following up the representative point position between frames, the block matching may be conducted while increasing the degree of weighting on a position as it is nearer to the representative point. For example, representing the position of a representative point by $(x_0, y_0)$ and representing a matching estimation range R by the equation (1), the weight w at an estimation position (x,y) is defined by the equation (2):

$$R=\{(x,y)|x_1 \leq x \leq x_2, y_1 \leq y \leq y_2\} \quad (1)$$

$$w(x,y)=bs-(|x-x_0|+|y-y_0|) \quad (2)$$

Here, bs is represented by the equation (3):

$$bs = \max\{|x_1 - x_0| + |y_1 - y_0|, |x_1 - x_0| + |y_2 - y_0|, \quad (3)$$
$$|x_2 - x_0| + |y_1 - y_0|, |x_2 - x_0| + |y_2 - y_0|\}$$

Any weighting coefficient map may be set in the area of the matching estimation range as a weighting method, and thus the weighting method is not limited to the above method.

The motion vector detection is performed by selecting the vector having the minimum matching prediction error in the vector of predetermined candidates. That is, representing a current frame image by C(x.y) and representing a reference frame image by P(x.y), the prediction error amount Err ($v_x$, $v_y$) when a candidate vector ($v_x$, $v_y$) is selected is defined as follows:

$$Err(v_x,v_y) = \sum_{(x,y)\in R} (C(x,y) - P(x+v_x,y+v_y))^2 \cdot w(x,y) \quad (4)$$

By using a absolute value sum without using a square sum for reducing the calculating load, the estimation may calculate as follows:

$$Err(v_x,v_y) = \sum_{(x,y)\in R} |C(x,y) - P(x+v_x,y+v_y)| \cdot w(x,y) \quad (5)$$

Alternatively, when triangular segments are used, a hexagonal area formed by linking triangular segment areas adjacent to a representative point concerned may be used as an estimation target area for the block matching algorithm method. However, the shape of the areas on the peripheral portion of the frame is not limited to the hexagonal shape.

Further, the motion vector detected by the matching method may be re-corrected by referring to the prediction result. For example, a re-search range of the motion vector is set with the motion vector detected by the matching method at the center of the re-search range. The motion compensated prediction errors in all the segment areas which are adjacent to the representative point concerned are estimated for candidate vectors in the re-search range, and the candidate vector having the minimum error is detected as the motion vector.

Next, an area indicating method in the segment area indicating means 303 will be described.

The indication of the segments is performed by successively indicating, in a predetermined order, the segments which are determined by setting the initial representative point positions. For example, the segment indication may be performed in an order from segments at the upper stage to segments at the lower stage and from a left side to a right side on a stage. As the position information of an indicated segment (patch), the coordinates of the vertex positions of the segment may be output in a connection order. With this operation, the picture elements in the segment are indicated.

Figure 6:
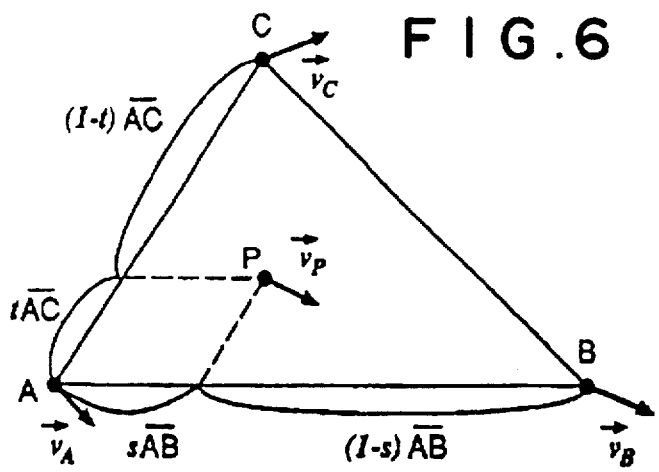
FIG. 6 is a diagram showing a method for calculating a interpolated vector in a triangular segment used in the present invention by linear interpolation.

In the indicated segment motion compensated prediction means 304, a motion compensated prediction signal in the indicated segment is generated. When the triangular segment is used, a triangular segment is first generated on the basis of the segment area information. The motion vector of each picture element in the segment is calculated on the basis of the motion vectors at the three vertexes by the linear interpolation method. For example, as shown in FIG. 6, the motion vector $v_P$ at a point in a triangle ABC can be calculated from the motion vectors $V_A$, $V_B$ and $V_C$ at the three vertexes of the triangle by the equation (6):

$$\vec{v}_P = (1-s-t)\vec{v}_A + s\vec{v}_B + t\vec{v}_C \quad (6)$$

Here, s represents the distance from the vertex A to an intersection point between the side AB and a line which is drawn to pass through the point P in parallel to the side AC when the distance of the side AB is set to "1", and t represents the distance from the vertex A to an intersection point between the side AC and a line which is drawn to pass through the point P in parallel to the side AB when the distance of the side AC is set to "1". The motion vectors at all the picture element positions in the segment are interpolatively calculated in the manner as described above to obtain the motion compensated position every picture element.

Figure 7:
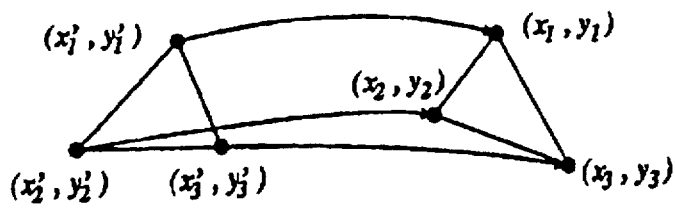
FIG. 7 is a diagram showing a method for performing the motion compensated prediction by mapping of a triangular segment used in the present invention.

FIG. 7 shows another method for calculating the motion compensated position every picture element.

In this method, the mapping is performed on corresponding triangular segments between frames, and the corresponding relationship between these segments is represented by affine transformation. According to this method, affine transformation parameters are obtained for a triangular segment concerned on the basis of the relationship of the corresponding three pairs of vertex positions. The motion compensated position of a picture element in the triangle is calculated on the basis of the affine transformation parameters.

A calculation method of the motion compensated position when the Affine transformation is used will be described.

Two-dimensional affine transformation represents the motion compensated position (x',y') on a reference image which corresponds to a position (x,y), by using six parameters a to f as shown in the equation (7):

$$\begin{pmatrix} x' \\ y' \end{pmatrix} = \begin{pmatrix} a & b \\ c & d \end{pmatrix} \cdot \begin{pmatrix} x \\ y \end{pmatrix} + \begin{pmatrix} e \\ f \end{pmatrix} \quad (7)$$

Here, representing the positions of the three vertexes of a triangle by ($x_1$, $y_1$), ($x_2$, $Y_2$) and ($x_3$, $Y_3$), and representing the positions of the three vertexes on a reference image corresponding to the triangle by ($x'_1$, $y'_1$), ($x'_2$, $y'_2$) and ($x'_3$, $y'_3$), the following equation (8) is satisfied:

$$\begin{pmatrix} x'_1 & x'_2 & x'_3 \\ y'_1 & y'_2 & y'_3 \end{pmatrix} = \begin{pmatrix} a & b & e \\ c & d & f \end{pmatrix} \cdot \begin{pmatrix} x_1 & x_2 & x_3 \\ y_1 & y_2 & y_3 \\ 1 & 1 & 1 \end{pmatrix} \quad (8)$$

The equation (8) is solved as the following equation (9), and the parameters can be calculated:

$$\begin{pmatrix} a & b & e \\ c & d & f \end{pmatrix} = \begin{pmatrix} x'_1 & x'_2 & x'_3 \\ y'_1 & y'_2 & y'_3 \end{pmatrix} \cdot \begin{pmatrix} x_1 & x_2 & x_3 \\ y_1 & y_2 & y_3 \\ 1 & 1 & 1 \end{pmatrix}^{-1} \quad (9)$$

The motion compensated positions of the picture elements in the triangle are calculated on the basis of the obtained affine transformation parameters according to the equation (7).

Figure 8:
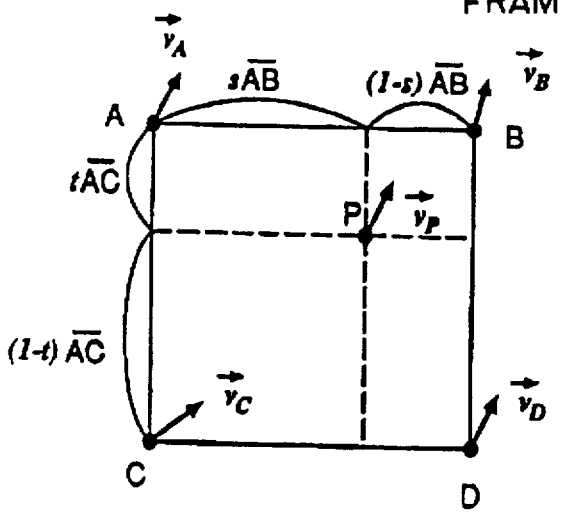
FIG. 8 is a method for calculating a motion vector in a rectangular segment used in the present invention by linear interpolation.
Figure 9:
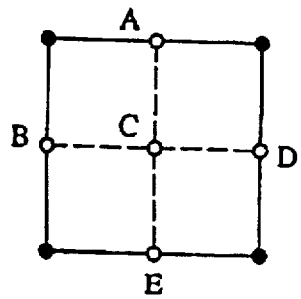
FIG. 9 is a diagram showing a conventional repartition method.
Figure 11A:
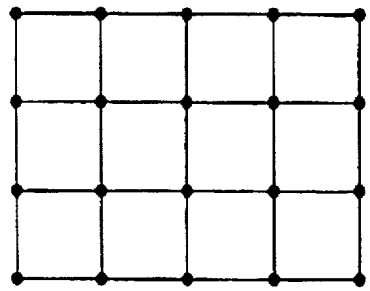
FIGS. 11A to 11C are a diagram showing an adaptive repartition mode of the conventional method.
Figure 11B:
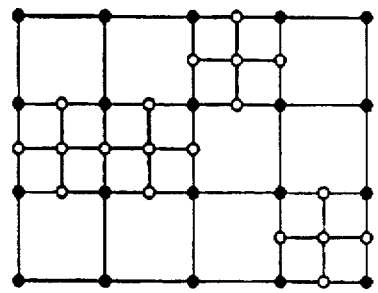
Figure 11C:
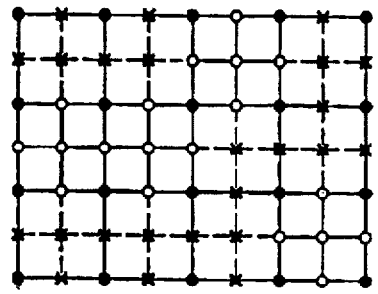
Figure 12:
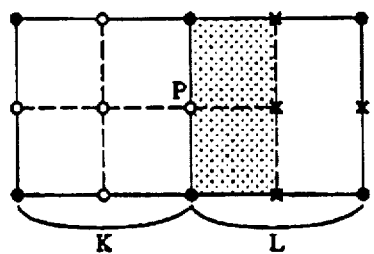
FIG. 12 is a diagram showing an effect of the repartition of the conventional method.

When rectangular segments are used, the motion vector at a picture element position in a segment is calculated on the basis of the motion vectors at the four vertexes of the rectangular segment by the linear interpolation method. For example, as shown in FIG. 8, the motion vector $v_P$ at a point P in a rectangular ABCD can be obtained on the basis of the motion vectors $v_A$, $V_B$, $V_C$ and $V_D$ at the four vertexes by the following equation (10).

$$\vec{v}_P = (1-s)\cdot(1-t)\cdot\vec{v}_A + s\cdot(1-t)\cdot\vec{v}_B + \quad (10)$$
$$(1-s)\cdot t\cdot\vec{v}_C + s\cdot t\cdot\vec{v}_D$$

Here, s, t represent the same parameters as the equation (6).

When hexagonal segments are used, the method as disclosed in Japanese Laid-open Patent Application No. Hei-6-327000 titles as "Motion Compensation Method" may be adopted. According to this method, the corresponding relationship from a reference image to an input image is defined on the basis of the motion vectors at the six vertexes of a hexagonal segment by two-dimensional transformation, whereby the motion vector at each picture element position in the segment can be calculated.

The motion compensated position for each picture element is determined as described above, and the picture element value at the motion compensated position on the reference image is set as an inter-frame prediction value. The value of a picture element which is not located at a sample point on the reference image is calculated by the linear interpolation method. The interpolation is performed by the following equation (11) where the picture element value at (x',y') is represented by p(x'.y') and $x_0=\lfloor x' \rfloor$, $y_0=\lfloor y' \rfloor$, $\alpha = x' - \lfloor x' \rfloor$, $\beta = y' - \lfloor y' \rfloor$:

$$P(x,y) = (1-\alpha) \cdot (1-\beta) \cdot P(x_0, y_0) + \alpha \cdot (1-\beta) \cdot P(x_0+1, y_0) + \quad (11)$$
$$(1-\alpha) \cdot \beta \cdot P(x_0, y_0+1) + \alpha \cdot \beta \cdot P(x_0+1, y_0+1)$$

Here, $\lfloor x \rfloor$ represents the maximum integer which does not exceed x.

The prediction values at all the picture element positions in the segment are calculated as described above to generate and output a prediction signal in the segment.

In the representative point adding means 305, the positions of representative points to be added are set when the repartition of an indicated segment is performed. For example, when triangular segments are used, a representative point is added at a predetermined position in a triangle segment as shown in FIG. 3A, and the triangular segment is repartitioned by lines which are obtained by linking the additive representative point and each of the three vertexes of the triangular segment. Alternatively, the triangular segment may be repartitioned by lines which are obtained by linking the additive representative points and the middle point on each side as shown in FIG. 3B. In this case, the motion vector at the middle point on each side is linearly interpolatively calculated from the motion vectors at both ends of the side (the representative points), so that the repartition can be performed without losing continuity of the motion vector to adjacent segments.

When rectangular segments are used, a representative point is added at an intersection point of diagonal lines as shown in FIG. 3C, and a rectangular segment is partitioned into four triangular subsegments by the diagonal lines. Alternatively, a representative point is added at an intersection point between two pairs of lines connecting the middle points on confronting sides as shown in FIG. 3D to partition the rectangular segment into four rectangular subsegments. In this case, like the triangle case, the motion vector at the middle point on each side is calculated from the motion vectors at both ends of the side (the representative points) by the linear interpolation method, so that the segment can be partitioned without losing the continuity of the motion vector to adjacent segments. Further, as shown in FIGS. 3E and 3F, partition lines may be added to repartition the segment into eight triangular subsegments.

Likewise, when hexagonal segments are used, a representative point is added at the center of a hexagonal segment as shown in FIG. 3G, and the hexagonal segment is partitioned by lines which are obtained linking the additive representative point and each of the vertexes of the hexagonal segment.

In the embodiment as described above, only one representative point is added to each segment. However, plural representative point may be added to each segment. For example, two representative points may be added for segment partition as shown in FIG. 3H.

In the foregoing description, the additive representative point is disposed at a predetermined position according to an arrangement procedure, however, it may be disposed at any position. As a method of determining the arrangement position may be used various methods such as a method of detecting feature points in a segment and setting a representative point at a position having the largest feature amount, a method of detecting an outline in a segment and setting a representative point at a position where the partition line for the re-partition is best matched to the outline or the like. Further, there may be used a method of estimating the motion compensated prediction error amount at plural representative point position candidates and selecting a candidate having the minimum prediction error. For example, partition modes shown in FIGS. 3I and 3J are obtained by altering the arrangement position of the partition mode shown in FIG. 3D.

In the additive representative point position motion vector detection means 306, the motion vector at the additive representative point position is detected. Like the method used in the motion vector detection means 302, the block matching algorithm method can be used as the detection method. Alternatively, the motion compensated prediction error amount at the plural motion vector candidates is estimated, and a candidate having the minimum prediction error is selected.

In the indicated segment under-partition motion compensated prediction means 307, the motion vector at each picture element position in a subsegment is interpolatively obtained by using the motion vectors at the vertex positions in every subsegment to perform the motion compensated prediction. The interpolation method of the motion vector can be achieved according to the method which was described for the indicated segment motion compensated prediction means 304. Finally, the prediction signals of the respective subsegments are integrated to generate a prediction signal when the indicated segment is partitioned (i.e., the repartition is performed).

In the adaptive segment partition judgment means 308, in order to judge whether the segment partition (frame repartition) should be performed, the prediction error when the indicated segment is partitioned is compared with the prediction error when it is not partitioned. When the partition is judged to be performed, there occurs additive code quantity such as the motion vectors of additive representative points, and when the position can be arbitrarily indicated, the position information thereof. Therefore, in an actual judgment method, the repartition is actually performed only when it is expected to improve the prediction performance to the extent that its improvement surpasses the increase of the additive code quantity. Specifically, an average square prediction error per picture element in a segment is calculated, and if its improvement degree is equal to or larger than a predetermined threshold value, the repartition is performed.

In the prediction value selection means 309, the prediction signal of the indicated segment is selected on the basis of the information as to whether the repartition is performed. That is, if the repartition is judged to be performed, the prediction signal when the repartition is performed is selected and output. If the repartition is judged not to be performed, the prediction signal when the prediction is performed with no repartition is selected and output.

In the additive representative point information selection means 310, the additive representative point information is selected on the basis of the information as to whether the repartition is performed, and then output. That is, the motion vector information at the additive representative point is output only if the repartition is judged to be performed. Further, when the representative point position can be arbitrarily set, the position information of the additive representative point is also output.

The motion vector information 4, the segment judgment mode information 12 and the additive representative point information 14 are coded by an adaptive way and output for being used to generations of the motion compensated prediction images inside of a regeneration apparatus. And, the selected prediction signal is used for detecting a difference of a original image if it is further to be coded of the prediction error signal.

As described above, according to the present invention, by setting the additive representative points only within the segments, excluding the boundary lines between the segments, the specific segments can be repartitioned without extending the effect of the addition of the representative points to the adjacent patches (segments). For example, when the triangular segments are used, as shown in FIG. 3A, a representative point is added in a triangular segment, and the segment is partitioned into subsegments by lines connecting the additive representative point to the vertexes of the triangular segment. The additive representative point is used for only the prediction of the interior of the segment, and it is not referred to for another segment. Therefore, the effect of the repartition does not extend to segments which are adjacent to the segment concerned. Alternatively, as shown in FIG. 3B, the segment may be partitioned by lines connecting the additive representative point to the middle points on the respective sides of the segment. In this case, the motion vector at the middle point on each side is calculated on the basis of the representative points at both ends of the side by the linear interpolation, whereby the repartition can be performed without losing the continuity of the motion vector to an adjacent segment. This is because even when an adjacent patch (segment) is not partitioned, a motion vector on a boundary line of a segment is coincident with a value which is obtained by linearly interpolating the motion vectors of the representative points at both ends of the boundary line. In this example, the additive representative point is also used only for the prediction of the interior of the segment, and it is not referred to for another segment, so that the effect of the repartition does not extend to an adjacent patch (segment).

As described above, according to the present invention, the repartition processing can be independently performed on a segment basis. Furthermore, the number of representative points to be added for the repartition can be reduced, and the increase of the processing amount for the motion estimation can be suppressed. In addition, the position of an additive representative point can set to any position in a segment, and the partition which is matched with the content of an image can be performed.

While this invention has been particularly shown and described with reference to the preferred embodiment thereof, it will be understood that various changes in form and details may therein without departing from the spirit and scope of the invention.

What is claimed is:

1. A motion compensated inter-frame prediction method comprising:

first step of setting plural representative points in a frame represented by moving picture signals and linking the representative points to one another to form plural segments in the frame;

second step of detecting motion vectors at the plural representative points as representative point motion vectors;

third step of interpolating the motion vectors at all picture element positions within the respective segments on the basis of the representative point motion vectors to perform the motion compensated prediction within each segment;

fourth step of adaptively and additionally setting into the respective segments additive representative points, which do not include the boundary lines between neighboring segments and for processing without effect on other segments with respect to a detected motion vector, and linking each of the additive representative points to the representative points surrounding the additive representative point to form subsegments;

fifth step of detecting the motion vector at the additive representative point as an additive representative point motion vector; and sixth step of interpolating the motion vectors at all the picture element positions in each subsegment on the basis of the additive representative point motion vectors to perform motion compensated prediction within each subsegment.

2. The method as claimed in claim 1, wherein said third step of performing the motion compensated prediction in each segment comprises said third step of interpolating the motion vectors at all the picture element positions in the segment on the basis of the representative point motion vectors to generate a first predictive signal, and said sixth step of performing the motion compensated prediction in each subsegment comprises a step of interpolating the motion vectors at all the picture element positions in the subsegment on the basis of the additive representative motion vectors to generate a second prediction signal.

3. The method as claimed in claim 2, further comprising seventh step of comparing the first prediction signal and the second prediction signal to select segments for which the segment partition is adaptively performed.

4. A motion compensated inter-frame prediction apparatus comprising:

first means for setting plural representative points in a frame which is represented by moving picture signals and linking the representative points to form segments in the frame;

second means for detecting the motion vectors at the plural representative points as representative point motion vectors;

third means for interpolating the motion vectors at all picture element positions in each segment to perform motion compensated prediction in the segment;

fourth means for adaptively and additionally setting into the respective segments additive representative points, which do not include the boundary lines between neighboring segments and for processing without effect on other segments with respect to a detected motion vector, and linking each of the additive representative points to the representative points surrounding the additive representative point to form subsegments;

fifth means for detecting the motion vector at the additive representative point as an additive representative point motion vector; and sixth means for interpolating the motion vector at all the picture element positions in the subsegment on the basis of the additive representative point motion vector to perform motion compensated prediction on the subsegment.

5. The apparatus as claimed in claim 4, wherein said third means interpolates the motion vectors at all the picture element positions in the segment on the basis of the representative point motion vectors to generate a first predictive signal, and said sixth means interpolates the motion vectors at all the picture element positions in the subsegment on the basis of the additive representative motion vectors to generate a second prediction signal.

6. The apparatus as claimed in claim 5, further comprises seventh means for comparing the first prediction signal and the second prediction signal to select segments for which the segment repartition is adaptively performed.

7. The apparatus as claimed in claim 4, wherein said second means detects the motion vectors by a block matching algorithm method, and each of said third means and said sixth means uses an affine transformation method to calculate the motion compensated position on a reference image from affine transformation parameters, and outputs an in-segment prediction signal for setting the picture element value at the motion compensated position as an inter-frame prediction value.

* * * * *